US006633562B1

(12) United States Patent
Boyd et al.

(10) Patent No.: US 6,633,562 B1
(45) Date of Patent: Oct. 14, 2003

(54) METHOD AND APPARATUS USING ENHANCED ATTACHMENT FOR IMPROVED CONNECTIVITY IN TELECOMMUNICATIONS

(75) Inventors: Christopher L. Boyd, Garland, TX (US); Hassen Pruitt, Plano, TX (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/127,483

(22) Filed: Jul. 31, 1998

(51) Int. Cl.[7] .............................................. H04L 12/66
(52) U.S. Cl. ........................ 370/356; 370/352; 370/363
(58) Field of Search ................................ 370/352, 356, 370/401, 410, 353, 363

(56) References Cited

U.S. PATENT DOCUMENTS

| | | | |
|---|---|---|---|
| 4,706,081 A | 11/1987 | Hart et al. ............. 340/825.03 |
| 4,764,919 A | 8/1988 | Hunter et al. ................. 370/60 |
| 5,182,748 A | 1/1993 | Sakata et al. ............... 370/94.1 |
| 5,218,676 A | 6/1993 | Ben-Ayed et al. ........... 395/200 |
| 5,251,207 A | 10/1993 | Abensour et al. ........... 370/60.1 |
| 5,303,237 A | 4/1994 | Bergman et al. ........... 370/85.6 |
| 5,313,465 A | 5/1994 | Perlman et al. .......... 370/85.13 |
| 5,353,336 A | 10/1994 | Hou et al. ..................... 379/67 |
| 5,361,259 A | 11/1994 | Hunt et al. .................... 370/84 |
| 5,434,850 A | 7/1995 | Fielding et al. ............... 370/50 |
| 5,490,141 A | 2/1996 | Lai et al. ................... 370/60.1 |
| 5,502,712 A | 3/1996 | Akita ........................... 370/16 |
| 5,513,172 A | 4/1996 | Shikama et al. ............... 370/13 |
| 5,517,620 A | 5/1996 | Hashimoto et al. ......... 395/200 |
| 5,521,909 A | 5/1996 | Holloway et al. ............ 370/54 |
| 5,521,914 A | 5/1996 | Mavraganis et al. .......... 370/60 |
| 5,568,605 A | 10/1996 | Clouston et al. ........ 395/182.02 |
| 5,587,999 A | 12/1996 | Endo .......................... 370/352 |
| 5,600,641 A | 2/1997 | Duault et al. ................ 370/400 |
| 5,675,578 A | 10/1997 | Gruber et al. .............. 370/248 |
| 5,692,126 A | 11/1997 | Templeton et al. .... 395/200.02 |
| 5,734,654 A | 3/1998 | Shirai et al. ................ 370/396 |
| 5,739,919 A | 4/1998 | Lee et al. ................... 358/407 |
| 5,805,690 A * | 9/1998 | Koepper et al. ............ 379/220 |
| 5,987,034 A * | 11/1999 | Simon et al. ............... 370/465 |
| 6,069,890 A * | 5/2000 | White et al. ................ 370/352 |
| 6,161,008 A * | 12/2000 | Lee et al. ................... 455/414 |
| 6,292,495 B1 * | 9/2001 | Von Hammerstein et al. ..... 370/465 |
| 6,317,793 B1 * | 11/2001 | Toyosawa ................... 709/228 |

OTHER PUBLICATIONS

PeopleSoft, Inc., "PeopleSoft WAN Testing", 1997, pp. 1–7.

* cited by examiner

Primary Examiner—Hassan Kizou
Assistant Examiner—Saba Tsegaye (57) ABSTRACT

Voice services provided over a packet switched facility such as a Frame Relay network are enhanced with routing capability by providing for attachment devices which, on initialization with the network, attempt to discover other similar attachment devices on the network. Thereafter the attachment devices exchange information on terminal accessibility to improve connectivity over the network.

23 Claims, 7 Drawing Sheets

| Location | PVC | Destination |
|---|---|---|
| 301 | A | 302 |
| 301 | B | 303 |
| 302 | C | 301 |
| 302 | D | 303 |
| 303 | E | 301 |
| 303 | F | 302 |

FRAD 604

```
OWN
  202
  703 - xxx
    ⋮
       yyy
  301 - AAA
    ⋮
       BBB
DOMAIN MARK
NPA - 801
NPA - 803
```

```
FRAD 604
OWN
  202
  703 - xxx
    ⋮
       yyy
  301 - AAA
    ⋮
       BBB
DOMAIN MARK
NPA - 801
NPA - 803
```

FIG. 7

METHOD AND APPARATUS USING ENHANCED ATTACHMENT FOR IMPROVED CONNECTIVITY IN TELECOMMUNICATIONS

TECHNICAL FIELD

The invention relates to telecommunications and more particularly to improvements in digital provisioning for voice services.

BACKGROUND OF INVENTION

For the majority of the history of telecommunications, voice has been the predominant application. Indeed, only recently has data transmission become significant. Nevertheless, the advances that have been made in data communications have been so profound that it is not unusual for modern data communications technology to be applied to carrying voice, in addition to data.

Many of the improvements in data communications relate to packet switching. Different varieties of data communication technology falling under the class of packet switching include Frame Relay (hereinafter also FR), Asynchronous Transfer Mode (ATM), Internet Protocol (IP), voice over Internet Protocol, SMDS, cell relay networks or the like.

Packet switching networks provide a payload transport capability which is applied to voice communication purposes. However, packet switching networks lack other services which are typically found in the voice dedicated network. For example, the routing or addressing facilities typically found in a voice network are not present in a packet switching network and accordingly, in order to provide packet switched transport capability for voice, some accommodation must be made for routing calls.

More particularly, when a voice switch such as a Private Branch Exchange (PBX) is adapted for service over the Integrated Services Digital Network (ISDN) addressing information is carried in the so called D channel. When adapting a PBX to connect to a Frame Relay (FR) network, the D channel, sourced at the PBX, terminates at an attachment device or more particularly, a Frame Relay Attachment Device (FRAD).

In this configuration, the FRAD is designed to provide a routing service to the PBX. The FRAD is capable of directing the call setup message to a particular Permanent Virtual Circuit (PVC) in the FR network so as to access the called terminal. In order to provide this service, however, the FRAD needs a correlation between terminal address (in voice applications this is the same as a telephone number or extension) and FR network channel. One of the difficulties with carrying voice services over packet switched networks is the problem of providing the FRAD or the like with this information. Complicating the problem is the dynamic nature of the information, requiring it to be constantly updated and/or revised so that it is accurate.

SUMMARY OF INVENTION

The invention solves the foregoing problem and provides technical advantages as described below. In particular, with respect to one aspect, the invention provides a method of enhancing the provision of voice services via packet switched facilities in which a voice switch is connected to the packet switched facilities using an associated attachment device, the method including:

storing, in plural attachment devices, information respecting voice terminals accessible through the associated voice switch;

generating a request from a particular attachment device to another attachment device for information respecting voice terminals accessible via the another attachment device's associated voice switch; and storing at the particular attachment device information received in response to the request.

With respect to another aspect, the invention relates to a system for providing enhanced voice services via packet switched facilities including a voice switch connecting to the packet switched facilities with an associated attachment device, the system including:

means in plural attachment devices for storing information respecting voice terminals accessible through the associated voice switch;

means in plural attachment devices for generating a request to another attachment device for information respecting voice terminals accessible via the another attachment device's associated voice switch; and second storing means in plural attachment devices for storing information received in response to the request.

BRIEF DESCRIPTION OF THE DRAWINGS

The present invention will now be described in further detail in the following portions of this specification when taken in conjunction with the attached drawings in which like reference characters identify identical apparatus and in which:

FIGS. 5A and 5B relate to an embodiment of the invention in an application in which Switched Virtual Channels are used and, in particular.

BEST AND VARIOUS MODES FOR CARRYING OUT INVENTION

Figure 1:
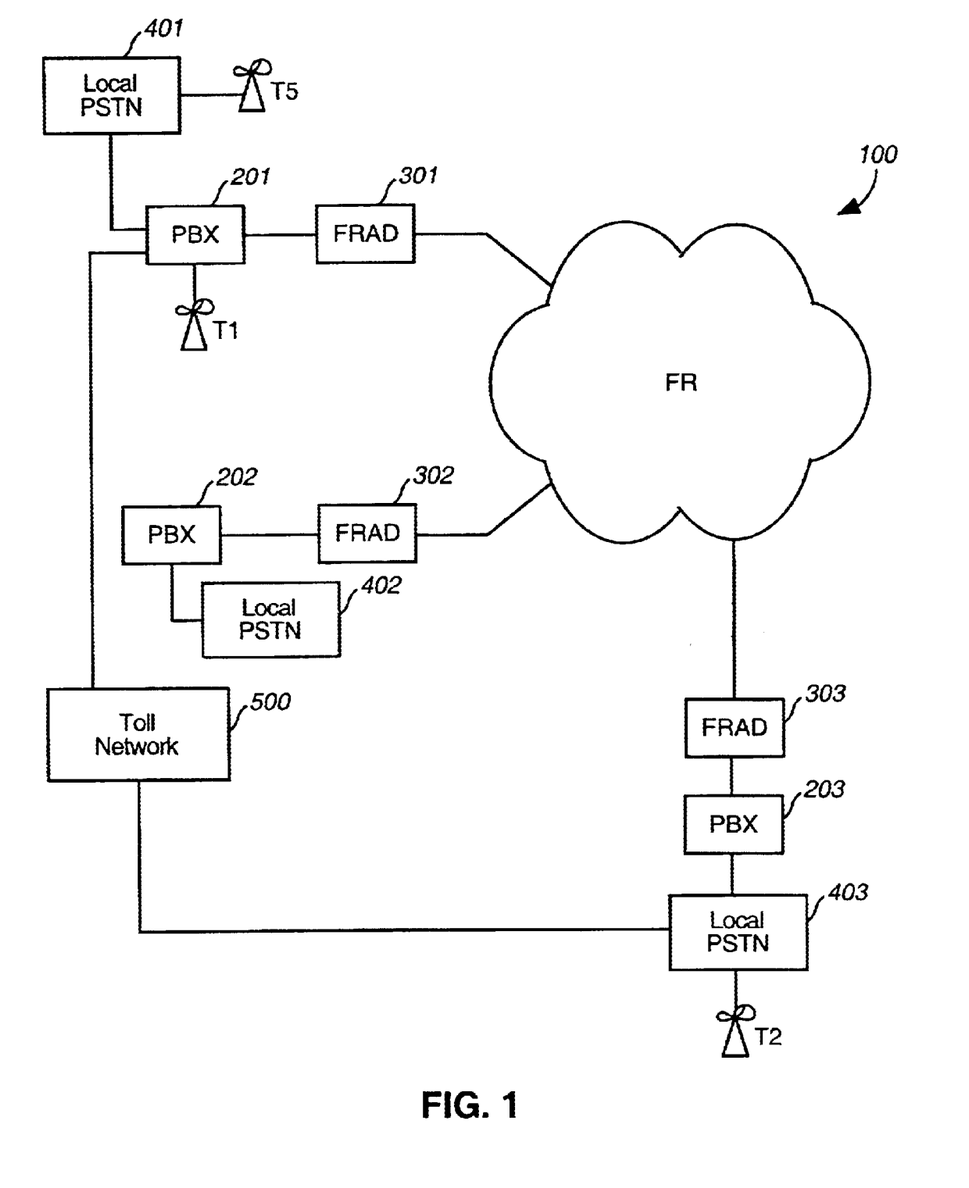
FIG. 1 is a block diagram illustrating a system operating in accordance with the present invention.

FIG. 1 shows a frame relay network 100. Included in the frame relay network 100 and not specifically illustrated in FIG. 1 are a plurality of data sources and sinks (here the term data is used to distinguish the form of the information from voice). FIG. 1 also shows several PBXs 201–203 which employ the services of the frame relay network to transmit voice. Coupled between each voice switch PBX 201–203 and the frame relay network 100 is an associated attachment device, particularly a Frame Relay Attachment Device (FRAD) such as FRADs 301–303.

FIG. 1 also shows the connection of each PBX to the local Public Switched Telephone Network or PSTN (local PSTN refers to the portion of the PSTN which is accessible to the associated PBX without incurring toll charges). Particularly, each PBX (including each of the illustrated PBX's 201–203) is capable of dialing into the local PSTN network and reaching thousands of telephone terminals. Because of typical calling tariffs, there is no per call charge for accessing any of this large number of terminals. More particularly PBX 201 may access any terminal connected in the local PSTN 401. Likewise, PBX 203 can access any terminal connected-in the local PSTN 403. In addition, of course, many telephone terminals, such as terminal T1 or T5 can access many other terminals, such as terminals T2. If this access traverses a toll network 500, that access will carry a toll charge. However, if such an access can be made through the Frame Relay network 100 then the toll charge can be avoided. FIG. 1 shows specific terminals connected in different local PSTNs; terminal T5 is connected in local PSTN 401 and terminal T2 is connected in local PSTN 403. Terminal T1 is also connected in local PSTN 401 via PBX 201.

Typically, a PBX may be configured to use ISDN. As such, when a call is placed by a terminal, such as the terminal T1, the PBX 201 formulates a call setup message in the D channel. The call setup message is received by the associated attachment device 301. The associated attachment device 301 reads the dialed number, i.e. the identification of the called terminal, such as the terminal T2, and forwards a call setup message across the FR 100 to the FRAD 303 which is associated with the PBX 203.

In order to be able to perform these functions, the FRAD 301 must "know" that the called terminal T2 is attached to the PBX 203 which is associated with the FRAD 303. More succinctly, the FRAD 301 must "know" that the call is intended for the voice switch associated with the FRAD 303.

One way to provide the FRAD 301 with this information is to manually insert the information into FRAD 301. This requires the manual loading of data in each of a plurality of attachment devices, which data identifies the terminals associated with each of the other attachment devices. Even if this were not a daunting task, changes in this data would quickly render the effort of little or no value.

To ease the burden and enhance the provision of voice services over the packet switched facility the attachment devices are modified to cooperate in sharing information respecting terminal accessibility. More particularly, and referring to FIG. 1, FRAD 301 is supplied with information identifying the telephone terminals which are accessible to the associated PBX, e.g. PBX 201. Accessible, in this context, means accessible without toll charges and without relying on FR 100. In other words, FRAD 301 is supplied with and stores information identifying the telephone terminals associated with the local PSTN 401. Each of these terminals is a terminal which is accessible to the PBX 201 without incurring toll charges. Each other attachment device, such as FRAD 302, FRAD 303, etc., is also supplied with this information, i.e. information identifying telephone terminals accessible through the associated PBX without incurring toll charges. In this fashion, FRAD 302 obtains information identifying telephone terminals accessible to PBX 202, and FRAD 303 obtains information respecting telephone terminals accessible via PBX 203, etc. The manner in which this class of information is supplied to the attachment devices may be manual or via any other suitable procedure.

Thereafter, the attachment devices exchange information with one another. In this way, for example, FRAD 301 obtains the information that identifies the telephone terminals accessible via the PBX associated with the attachment device 302 and the telephone terminals accessible via the PBX associated with attachment device 303, etc.

With this information, when the call setup message is received by the attachment device 301, for example, it can determine, by reviewing this information, if the called terminal is among the list of terminals accessible to any PBX coupled to the attachment devices of frame relay network 100. Upon learning that the called terminal is accessible to an identified one of the PBXs coupled to the frame relay network 100, the call setup message is directed to the attachment device associated with that PBX, as is described in more detail below.

More particularly, frame relay networks include Permanent Virtual Circuits (PVC) and may also include Switched Virtual Circuits (SVC). The simpler frame relay networks, including most frame relay networks implemented today, are supplied with PVC to the exclusion of SVC. In terms of FIG. 1, then, PBX 202/FRAD 302 is accessed from FRAD 301 via a particular PVC, in other words one PVC, available at FRAD 301, is dedicated to reaching FRAD 302. A different PVC, available at FRAD 301, is used by FRAD 301 to access FRAD 303.

Figure 4:
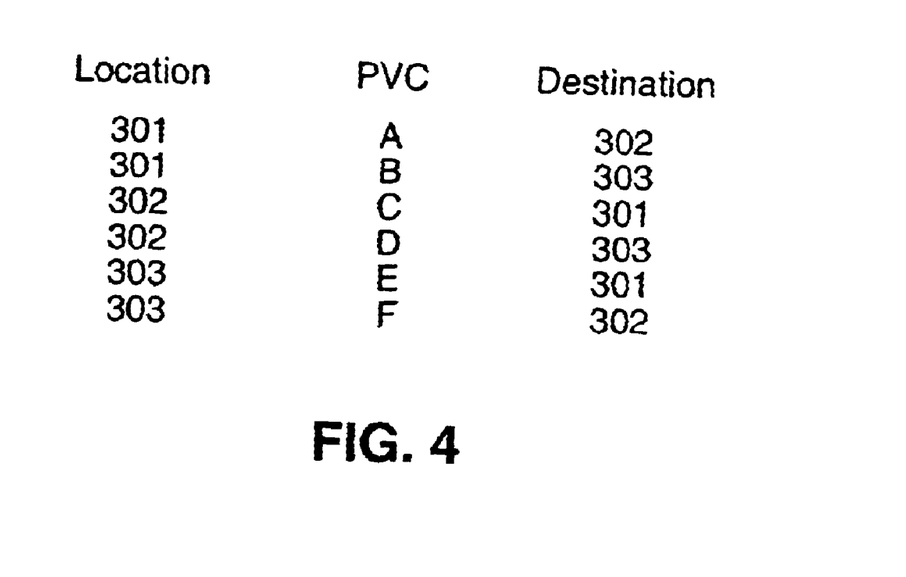
FIG. 4 illustrates a correlation of several PVCs and attachment devices.

FIG. 4 represents the function of six PVCs in frame relay network 100. In particular, PVC A is available at attachment device 301 and it accesses attachment device 302. PVC B is also available at attachment device 301 and it accesses device 303, etc.

Figure 3:
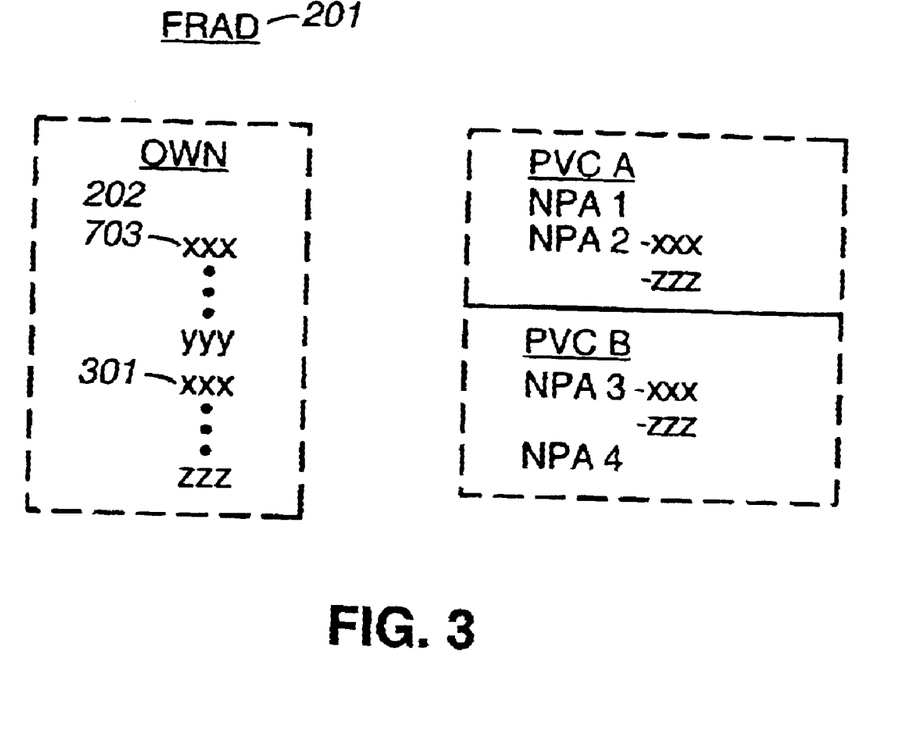
FIG. 3 illustrates information which may be found in the memory of an attachment device in accordance with the present invention.

FIG. 3 illustrates a portion of the memory of a typical attachment device such as FRAD 301. The memory illustrated in FIG. 3 is dedicated to storing information respecting terminals which are accessible either directly or via FR100. The information is divided into two portions, a first portion is shown at the left, headed "OWN". This information identifies the telephone terminals accessible to the particular attachment device via the associated PBX. If, for example, the PBX 201 were located in Washington, D.C., this complement of terminals would be identified (in conventional NPA or NPA-NXX fashion) as shown in FIG. 3. In particular, the PBX in Washington, D.C. is capable of accessing any telephone terminal with a 202 NPA. In addition, there is a range of telephone terminals with a 703 prefix which are accessible to the PBX in Washington, D.C. This is identified in FIG. 3 as 703-XXX through 703-YYY. Likewise, there is a range of telephone terminals with a 301 NPA which are accessible to the PBX in Washington, D.C. These are identified in FIG. 3 as 301-XXX through 301-ZZZ. The list just described identifies each telephone terminal accessible to the PBX 201 on the assumption that PBX was located somewhere in Washington, D.C.

Prior to interaction between a particular attachment device such as the FRAD 301 and any other attachment device, the information just described is the only information available to that particular attachment device respecting telephone terminals accessible to the associated PBX.

After the attachment device 301 is placed into service and allowed to interact with other attachment devices as will be described, its memory will contain additional information, i.e. that that information in FIG. 3, shown at the right. This information is divided into two exemplary portions, each identified by a different PVC identification. For example, FIG. 3 shows a first PVC, i.e. PVC A, and a second PVC, i.e. PVC B. Each portion of FIG. 3 also associates a list of accessible telephone terminals. Under the heading PVC A, FIG. 3 shows two groups of telephone Y terminals, one including a particular NPA, in this case NPAI, as well as some but not all of telephone terminals with a different NPA, i.e. NPA2. In particular, telephone terminals in the range NPA2-XXX through NPA2-ZZZ are included. FIG. 3 also indicates that PVC B is associated with a different complement of telephone terminals, some telephone terminals including an NPA3 prefix, and particularly NPA3-XXX through NPA3-ZZZ as well as all telephone terminals with an NPA4 prefix. NPA1, as well as some but not all of telephone terminals with a different NPA, i.e. NPA2. In particular, telephone terminals in the range NPA2-XXX through NPA2-ZZZ are included. FIG. 3 also indicates that PVC C is associated with a different complement of telephone terminals, some telephone terminals including an NPA3 prefix, and particularly NPA3-XXX through NPA3-ZZZ as well as all telephone terminals with an NPA4 prefix.

The manner in which this information is acquired and the manner in which it is used will now be described.

Figure 2A:
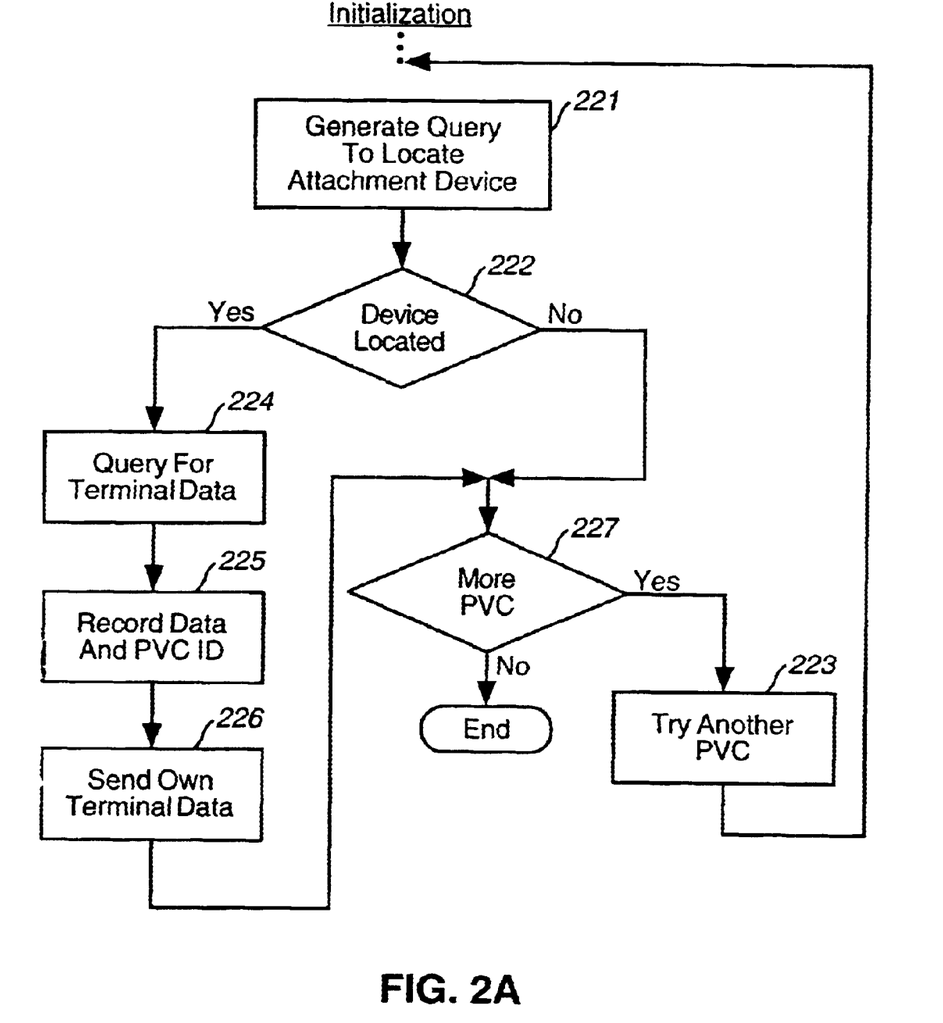
FIGS. 2A through 2C are flow charts which represent the operation of typical attachment devices of FIG. 1.
Figure 2B:
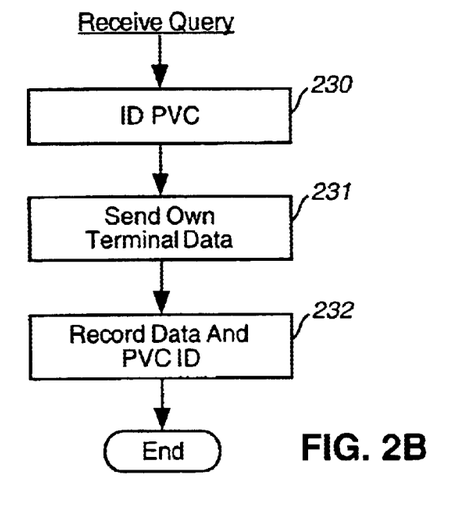
Figure 2C:
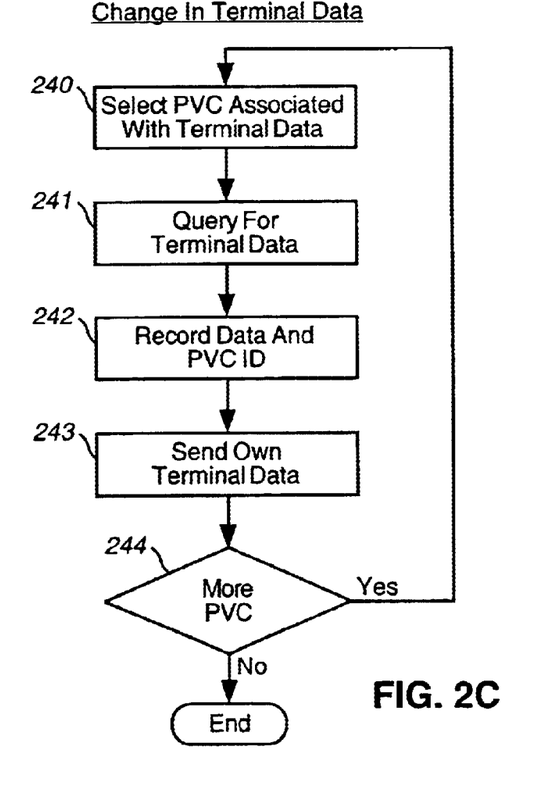

FIGS. 2A through 2C show respectively an initialization process implemented by a typical attachment device, a receive query process and a change in terminal data process, all executed by an attachment device at different times. The initialization process is executed on the attachment device joining a particular network. In order to explain the operation of this process, assume that the system shown in FIG. 1 has been in operation for some time. In particular, the frame relay network 100 has coupled to it attachment devices 302 and 303, each of which in turn is associated with its respective PBX, PBX 202 and PBX 203. In addition, each of the attachment devices 302 and 303 has information respecting terminals accessible through its associated PBX as well as information respecting terminals accessible through the other (the manner in which the latter function is accomplished will be described below). Furthermore, assume that FRAD 301 has just been initialized in the frame relay network 100. As part of that initialization process, steps 221 through 227 are performed.

Step 221 generates a query from the attachment device 301 to locate other attachment devices connected to the frame relay network 100. Two such attachment devices which will be located are attachment devices 302 and 303. Assume, for example, that at step 222, attachment device 302 is located. Thereafter, step 224 generates a query, directed at the attachment device 302, for terminal data. The query is directed at attachment device 302 by being directed to the particular PVC which allows attachment device 301 to D access attachment device 302. The query for terminal data is a query for the data of attachment device 302 stored in its own terminal portion, i.e. the left hand portion of FIG. 3. As will be described below, when attachment device 302 receives this query, it returns the requested data such that at step 225, attachment device 301 records the received data along with the PVC ID. This data is recorded as a block in the right hand portion of the memory of attachment device 301. Thereafter, step 226 sends own terminal data from the attachment device 301 to the attachment device 302. Step 227 then determines whether additional PVCs should be queried to locate additional attachment devices. If the positive response is active, then step 223 selects another PVC and the process is repeated. In this fashion, attachment device 301 will attempt to locate an attachment device on each PVC available to it. Each time another attachment device is located, the attachment devices will exchange terminal data, i.e. each will send the other its own terminal data information.

FIG. 2B illustrates the operation at an attachment device when it receives a query for own terminal data. The first step, step 230, identifies the PVC on which the query has been received. This information allows the receiving device to reply to the device which initiated the query. Step 231 sends own terminal data, as requested, and step 232 records the received data (that is, the data received from the querying attachment device) along with the PVC ID.

Finally, assuming that all attachment devices have exchanged own terminal data with all other attachment devices, and that no new attachment devices enter the network 100, there still is a requirement to cover changes in accessible terminal information because of outside factors, e.g. new NPAs, etc. Accordingly, the process of FIG. 2C is implemented when a change in own terminal data is identified at a particular attachment device. In particular, once a change in own terminal data has been detected, the attachment device must exchange that information with each other attachment device which is within the frame relay network 100. Function 240 is used to select a PVC associated with an attachment device, i.e. the PVC is identified in the first line on the blocks in the right hand portion of FIG. 3. Functions 241 through 243 generate a query for own terminal data of the another attachment device located at the selected PVC. Function 242 records the received data and the PVC ID and function 243 sends the now-changed own terminal data. Function 244 is used to determine when all pertinent PVCs have been run through the process of functions 240 through 243.

The manner in which the information in the attachment device memory is used should be apparent from FIG. 3 but a brief description will suffice. In particular, assume that a call is generated at PBX 201 for a particular called number which is included in NPA3. PBX 201 incorporates this call setup message into the D channel and transfers it to attachment device 301. Attachment device 301 reviews the list of telephone terminals identified in memory (see the right hand portion of FIG. 3). In the first block (under the heading PVC A), the attachment device would not find the called terminal since this block includes only NPA1 and NPA2. However, when the attachment device 301 checks the next block, it will find that it includes NPA3 terminals and assuming that there is a match between the called number and the range of NPA3 numbers accessible, then the attachment device 301 will send the setup message for this particular call through PVC C to access the appropriate attachment device for call completion.

The foregoing description is based on a frame relay network which employs PVC and not SVC. FIG. 4 for example shows that the six PVCs illustrated are dedicated so that, for example, PVC A only accesses device 302 from device 301.

The invention is also applicable, however, to networks which include SVC. The invention operates with even more capability in the SVC environment than in the PVC environment.

In the PVC environment, for every attachment device pair which does not have a PVC therebetween, there are some terminals that cannot be reached; in other words, complete connectivity requires a full mesh. The SVC capability eliminates the necessity for fully meshed connectivity.

The SVC allows a given channel to be addressed, i.e. to access more than one destination as opposed to the PVC which is dedicated to a single destination. Thus, a typical FRAD can use a channel into the FR to connect to any other FRAD which is also part of the FR, so long as the address of the other FRAD is known.

Figure 5A:
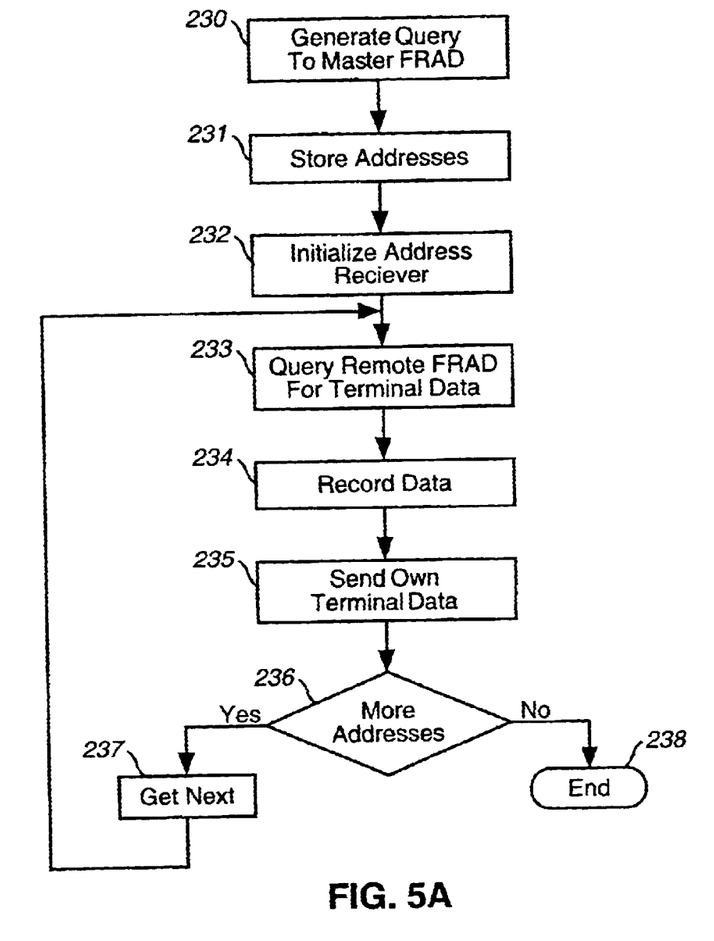
FIG. 5A shows a portion of an initialization routine for a typical FRAD and FIG. 5B shows the relationship between exemplary FRADs 310, 311 and 312 and the FR 300.
Figure 5B:
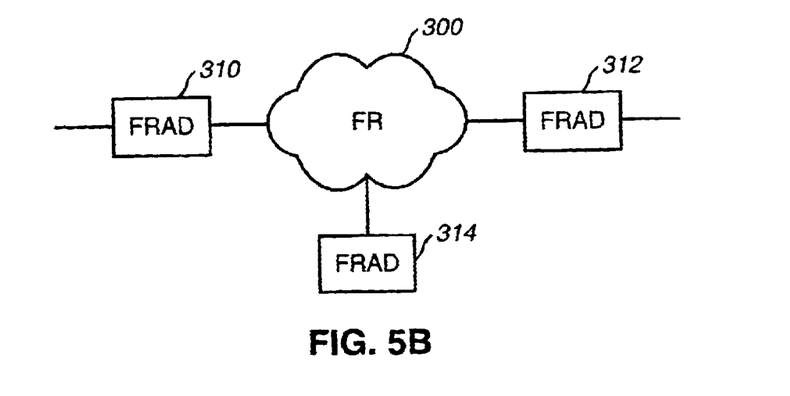

Refer to FIG. 5B. FIG. 5B illustrates a frame relay network 300 which includes, among other things, Switched Virtual Channel capability and includes FRAD 310–312. We will assume for this description that FRAD 310 has been denominated as the master or the controller. We will also assume that newly added FRAD 311 is in the process of being initialized, whereas FRAD 312 has been initialized at some time in the past. In the initialization process for FRAD 311, FRAD 311 will receive information identifying FRAD 310, and its address, as the network controller. Rather than having to query each possible address from FRAD 311, FRAD 311 then merely accesses FRAD 310, using the address already supplied. Thus, with SVC capability in the frame relay network, initialization steps formerly shown in FIG. 2A can be replaced by the steps shown in FIG. 5A. Function 230 generates the query to the master FRAD as already explained. That query requests the addresses for all other FRADs, function 231. The querying FRAD, 311 in this case, stores the addresses, function 231, and then initializes its address register, function 232. The initializing FRAD 311 will then perform functions 233–235 for each address it has received. These functions provide for the exchange of local terminal information between the new FRAD and the "old" FRAD. Functions 236 and 237 provide for changing the address register to reach other, yet unprocessed, FRADs, until all members of the network have been processed, at which time the process terminates.

At the time FRAD 311 receives address information on other attachment devices in the network from the master FRAD 310, the address data base of master FRAD 310 is altered by adding information respecting the new addition, FRAD 311. Accordingly when a further new attachment device joins the network it will receive addressing information on attachment device 311 along with the others previously in the network.

The foregoing embodiments, including frame relay networks with only PVC and frame relay networks with SVC, are limited to single domains, i.e. there is only a single frame relay network. The invention, however, is not limited to single domain applications as will now be described.

Figure 6:
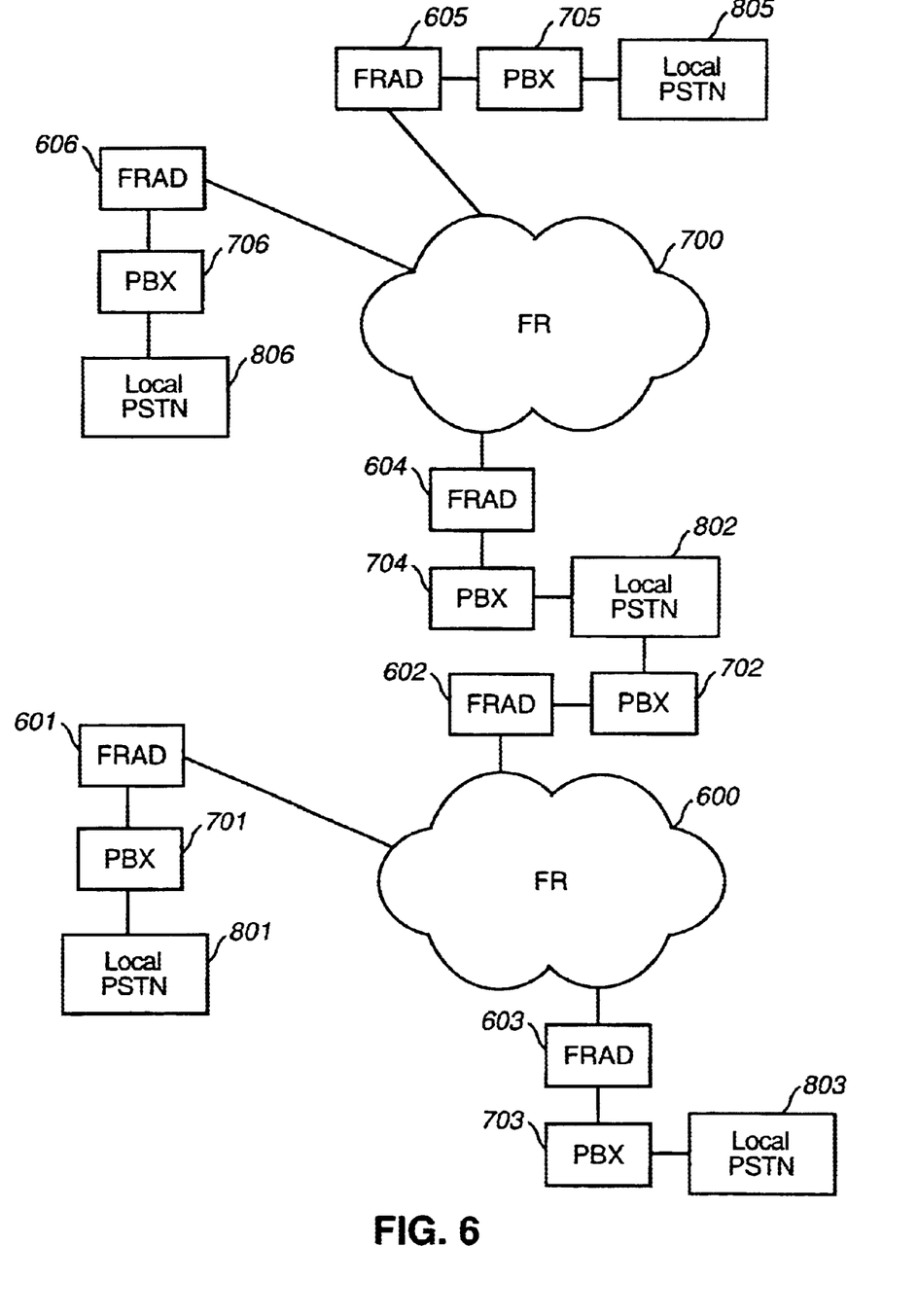
FIG. 6 illustrates an application of the invention which allows cooperation among attachment devices in multiple frame relay networks so long as they have gateway access to each other.

FIG. 6 shows two domains, one centered on frame relay network 600 and the other centered on frame relay network 700. Each domain can be enhanced with the features of the present invention. However, in this multiple domain application further advantages accrue. Application of the invention allows any terminal in local PSTN 801 to connect via frame relay network 600 to any terminal in local PSTN 802 or 803, as has already been explained. Likewise, employing the principles of the invention, any terminal in exemplary local PSTN 806 can connect to any terminal in local PSTN 805 or 802. However, since local PSTN 802 is common to the two domains, the FRADs 604 and 602 can act as "gateways" into its local domain for the remote domain, as will now be explained.

Figure 7:
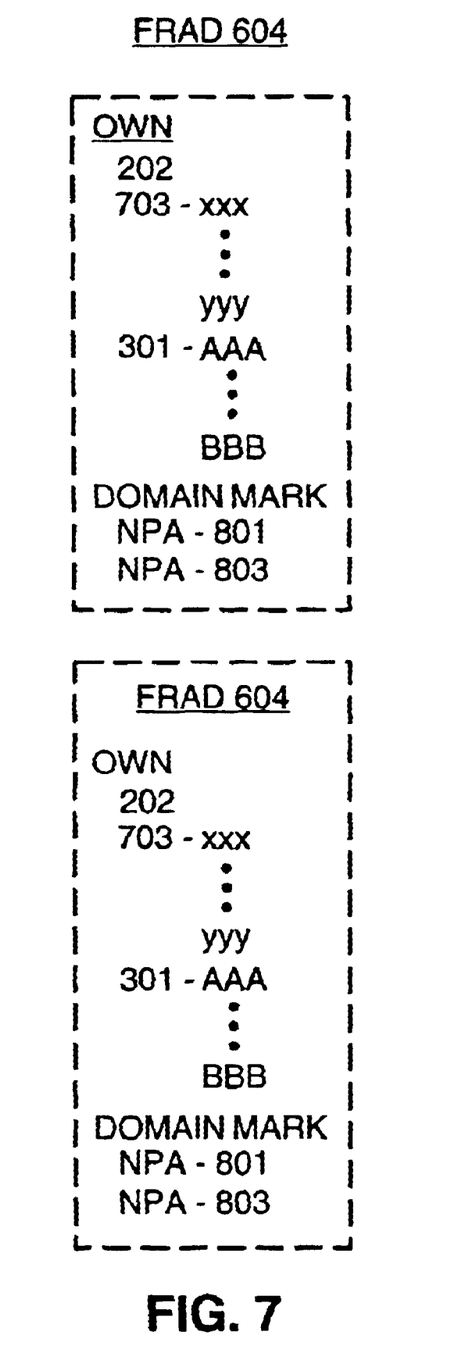
FIG. 7 illustrates portions of the data in the "own" terminal listing of particular FRAD entities of FIG. 6.

FIG. 7 shows the internal memories for FRAD 604 and FRAD 602, respectively and particularly that portion in which the own terminal information is identified. In this example, we have assumed that local PSTN 802 (which is local to FRAD 604 and FRAD 602) represents the Washington, D.C. area such that the own terminal identification for FRAD 602 and 604 is the same as that used for FIG. 3. Thus the own terminal for both FRAD 604 and 602 identify the following, as local terminals:

202

703-xxx-yyy 301-aaa-bbb

However, in its function as a gateway FRAD 604 also identifies, following a domain mark (to indicate that the terminals listed below are in a different domain), information including NPA information for local PSTN 801 and local PSTN 803. In other words, when FRAD 604's "own" terminal information is dispersed to FRAD 606 and 605 via FR 700, those entities will discover that they can reach local areas 801 and 803 via FRAD 604. Correspondingly, the own terminal list contained in FRAD 602 will include, in addition to the 202, 703 and 301 NPA information, and set off by a domain mark, the NPA information for local PSTN 806 and 805. Thus when FRAD 602 "own" terminal information is dispersed among the members of FR 600, those members (including FRAD 601 and 603) will learn that they can reach PSTN 806 and 805 via FRAD 602 as a "gateway".

In operation, the presence of the data below the domain mark in the memory of FRAD 602 will result in the distribution of that information to other members of FR 600. Distributing that information to FRAD 601 and 603 (other members of FR 600) will enable those devices to recognize that terminals in local PSTN 805 and 806 are accessible in the "other domain". Likewise, the presence of the data below the domain mark in the memory of FRAD 604 will result in the distribution of that information to other members of FR 700.

Distributing that information to FRAD 605 and 606 (other members of FR 700) will enable those devices to recognize that terminals in local PSTN 801 and 803 are accessible in the "other domain".

While several embodiments of the invention have been described in detail, those examples should not be considered limiting, rather the scope of the invention should be construed in accordance with the claims attached hereto.

What is claimed is:

1. A method of enhancing the provision of voice services via packet switched facilities in which a voice switch is connected to the packet switched facilities using an associated attachment device, the method including:

storing, in plural attachment devices, information respecting voice terminals accessible through the associated voice switch, generating a request from a particular attachment device to another attachment device for information respecting voice terminals accessible via the another attachment device's associated voice switch, and storing at the particular attachment device information received in response to the request from the particular attachment device.

2. The method of claim 1 wherein the particular attachment device, prior to generating a request to another attachment device, generates a query to one or more virtual circuits, accessible from the particular attachment device, to determine if the channel accesses another attachment device, and generates the request in an instance in which another attachment device is identified.

3. The method of claim 1 or claim 2 wherein the particular attachment device, transmits accessibility information, respecting voice terminals accessible through the voice switch associated with the particular attachment device, to the another attachment device.

4. The method of claim 1 or claim 2 wherein the another attachment device responds to the request by the particular attachment device by transmitting the accessibility information respecting voice terminals reachable via the associated voice switch.

5. The method of claim 2 in which the particular attachment device stores, along with the information respecting voice terminals accessible through the another attachment device's associated voice switch, information identifying the particular circuit through which the another attachment device is accessible.

6. The method of claim 2 wherein the act of generating a query is executed on initialization of the particular attachment device.

7. The method of claim 5 which further includes exchanging identities of voice terminals accessible through the associated voice switch with other attachment devices when there is a change in the set of voice terminals accessible through the associated voice switch.

8. The method of claim 1 or claim 2 in which the attachment device is a frame relay attachment device and the packet switched facility is a frame relay network.

9. The method of claim 1 or 2 in which the voice switch is a PBX and is also coupled to the PSTN.

10. The method of claim 1 wherein the information respecting voice terminals accessible through the associated voice switch identifies terminals which are directly accessible to the associated voice switch or terminals which are accessible through the associated voice switch through a packet switched network.

11. A system for providing enhanced voice services via packet switched facilities including a voice switch connecting to the packet switched facilities with an associated attachment device, said system including:
   means in plural attachment devices for storing information respecting voice terminals accessible through the associated voice switch,
   means in a particular attachment device for generating a request to another attachment device for information respecting voice terminals accessible via the another attachment device's associated voice switch, and
   second storing means in the particular attachment device for storing information received in response to the request.

12. The system as recited in claim 11 which further includes:
   means in plural attachment devices for generating a query to one or more virtual circuits, accessible from an attachment device, to determine if the circuit accesses another attachment device, and wherein
   said means in a particular attachment device for generating a request, generates the request in an instance in which another attachment device is identified at a particular circuit.

13. The system of claim 12 wherein the particular attachment device further includes transmit means for transmitting accessibility information, respecting voice terminals accessible through the voice switch associated with the particular attachment device, to another attachment device after identifying the another attachment device.

14. The system of claim 13 wherein the attachment device includes means to respond to the request by transmitting the accessibility information respecting voice terminals accessible via the associated voice switch.

15. The system of claim 13 in which the means for storing stores, along with the information respecting voice terminals accessible through the attachment device's associated voice switch, information identifying the particular circuit through which the another attachment device is accessible.

16. The system of claim 12 or claim 13 wherein the means for generating a query is operated in response to initialization of the associated attachment device.

17. The system of claim 11 where plural attachment devices further include means, responsive to a change in the set of voice terminals accessible through the associated voice switch, for initiating an exchange of identities of voice terminals accessible through the associated voice switch with other attachment devices.

18. The system of claim 11 in which the attachment device is a frame relay attachment device and the packet switched facility is a frame relay network.

19. The system of claim 11 which the voice switch is a PBX and is also coupled to the PSTN.

20. The system of claim 11 wherein the information respecting voice terminals accessible through the associated voice switch identifies terminals which are directly accessible to the associated voice switch or terminals which are accessible through the associated voice switch through a packet switched network.

21. A system for provisioning voice services over a frame relay network, comprising:
   a plurality of voice switch private branch exchanges coupled via respective frame relay attachment devices to a first frame relay network; and
   a first plurality of voice terminals coupled to the plurality of private branch exchanges, respectively,
   wherein each frame relay attachment device is configured to store an identification of all first voice terminals accessible, without incurring toll charges, to the respective private branch exchange of the frame relay attachment device, and
   each frame relay attachment device is configured to store an identification of all first voice terminals accessible, without incurring toll charges, to the other private branch exchanges of the other frame relay attachment devices.

22. The system of claim 21, further comprising:
   a plurality of public switched telephone networks coupled to the plurality of private branch exchanges, respectively; and
   a second plurality of voice terminals coupled to the plurality of public switched telephone networks, respectively,
   wherein each frame relay attachment device is configured to store an identification of all second voice terminals accessible, without incurring toll charges, to the respective private branch exchange of the frame relay attachment device, and
   each frame relay attachment device is configured to store an identification of all second voice terminals accessible, without incurring toll charges, to the other private branch exchanges of the other frame relay attachment devices.

23. The system of claim 22, further comprising:
   a second frame relay network including respective frame relay attachment devices, private branch exchanges, public switched telephone networks, and first and second voice terminals coupled to the first frame relay network via a common public switched telephone network,
   wherein each frame relay attachment device is configured to store an identification of all first second voice terminals accessible, without incurring toll charges, to the respective private branch exchange of the frame relay attachment device of the first and second frame relay networks, and
   each frame relay attachment device is configured to store an identification of all first and second voice terminals accessible, without incurring toll charges, to the other private branch exchanges of the other frame relay attachment devices of the first and second frame relay networks.

* * * * *